(12) United States Patent
Stockhammer (10) Patent No.: US 9,699,229 B2
(45) Date of Patent: Jul. 4, 2017

(54) ROBUST LIVE OPERATION OF DASH

(71) Applicant: QUALCOMM Incorporated, San Diego, CA (US)

(72) Inventor: Thomas Stockhammer, Bergen, DE (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 14/598,110

(22) Filed: Jan. 15, 2015

(65) Prior Publication Data
US 2015/0200986 A1  Jul. 16, 2015

Related U.S. Application Data

(60) Provisional application No. 61/928,381, filed on Jan. 16, 2014.

(51) Int. Cl.
*G06F 15/16* (2006.01)
*H04L 29/06* (2006.01)
*H04N 21/61* (2011.01)
*H04N 21/845* (2011.01)

(52) U.S. Cl.
CPC ..... *H04L 65/4069* (2013.01); *H04N 21/6125* (2013.01); *H04N 21/8455* (2013.01); *H04N 21/8456* (2013.01)

(58) Field of Classification Search
CPC ..... H04L 65/105; H04L 65/608; H04N 21/61; H04N 21/43
See application file for complete search history.

(56) References Cited

U.S. PATENT DOCUMENTS

| 2010/0049863 | A1* | 2/2010 | Heuer | H04N 21/23617 709/231 |
| 2012/0272281 | A1 | 10/2012 | Ha et al. | |
| 2013/0091251 | A1 | 4/2013 | Walker et al. | |
| 2014/0019587 | A1* | 1/2014 | Giladi | H04L 29/06476 709/217 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Yves Dalencourt
(74) *Attorney, Agent, or Firm* — Shumaker & Sieffert, P.A.

(57) ABSTRACT

In one example, a device for receiving data related to streaming media data includes one or more network interfaces configured to send and receive data via a network, and one or more processors configured to receive, via the network interfaces, data for a first period of media content and a second period of the media content, wherein the data for the first period indicates that at least some media data of the first period is not available, and wherein the data for the second period indicates available media data for the second period, and based on the data for the first period and the second period, omitting requests for media data of the first period that the data for the first period indicates is not available and sending one or more requests for the media data of the second period.

28 Claims, 4 Drawing Sheets

(56) References Cited

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (For FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Fielding, et al., "Hypertext Transfer Protocol—HTTP/1.1," Network Working Group, RFC 2616, Jun. 1999, 160 pp.

"Information technology—Dynamic adaptive streaming over HTTP (DASH)—Part 1: Media presentation description and segment formats, Technical Corrigendum 1," ISO/IEC JTC 1/SC29, Jan. 17, 2014, 14 pp.

Stockhammer, et al., Improved Support for Live 24/7 Services, ISO/IEC JTC1/SC29/WG11 MPEG 2014/M32298, Jan. 2014, 3 pp.

International Search Report and Written Opinion from International Application No. PCT/US2015/011817, dated Mar. 13, 2015, 11 pp.

Response to Written Opinion dated Mar. 13, 2015 from International Application No. PCT/US2015/011817, filed on Apr. 14, 2015, 5 pp.

Second Written Opinion from International Application No. PCT/US2015/011817, dated Nov. 27, 2015, 6 pp.

Response to Second Written Opinion dated Nov. 27, 2015 from International Application No. PCT/US2015/011817, filed on Jan. 27, 2016, 5 pp.

International Preliminary Report on Patentability from International Application No. PCT/US2015/011817, mailed May 17, 2016, 7 pp.

Response to Third Written Opinion mailed Apr. 6, 2016, from International Application No. PCT/US2015/011817, dated May 2, 2016, 7 pp.

Third Written Opinion of International Application No. PCT/US2015/011817, mailed Apr. 6, 2016, 6 pp.

"Guidelines for Implementation: DASH-AVC/264 interoperability Points DASH Industry Forum", DASH Industry Forum, Aug. 15, 2013 (Aug. 15, 2013), Version 2.0, XP055174477, pp. 1-46.

\* cited by examiner

ROBUST LIVE OPERATION OF DASH

This application claims the benefit of U.S. Provisional Application No. 61/928,381, filed Jan. 16, 2014, the entire contents of which are hereby incorporated by reference.

TECHNICAL FIELD

This disclosure relates to transport of coded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265/MPEG-H, Part 2 High Efficiency Video Coding (HEVC) and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as Carriage of NAL Unit structured Video.

SUMMARY

In general, this disclosure describes techniques that may be used to improve robustness of Dynamic Adaptive Streaming over HTTP (DASH). In particular, there may be instances where a DASH streaming server, or other such streaming server, receives live media data to be streamed to one or more client devices. For example, the DASH streaming server may receive media data from a content producer on a live basis, e.g., in real time on the fly. A communication session between the content producer and the DASH streaming server may be unreliable, e.g., may result in losses of media data. The techniques of this disclosure include signaling, by the server, data indicating that media data corresponding to the losses is not available. In this manner, a client device may receive the signaled data and omit sending requests for the missing media data. These techniques may reduce bandwidth consumption by avoiding requests for data that the server has determined will not be available. These techniques may also prevent connection termination due to excess error responses from the server, in response to requests for media data from the client, indicating that the requested media data is not available.

In one example, a method of receiving data related to streaming media data includes receiving data for a first period of media content and a second period of the media content, wherein the data for the first period indicates that at least some media data of the first period is not available, and wherein the data for the second period indicates available media data for the second period, and based on the data for the first period and the second period, omitting requests for media data of the first period that the data for the first period indicates is not available and sending one or more requests for the media data of the second period.

In another example, a device for receiving data related to streaming media data includes one or more network interfaces configured to send and receive data via a network, and one or more processors configured to receive, via the network interfaces, data for a first period of media content and a second period of the media content, wherein the data for the first period indicates that at least some media data of the first period is not available, and wherein the data for the second period indicates available media data for the second period, and based on the data for the first period and the second period, omitting requests for media data of the first period that the data for the first period indicates is not available and sending one or more requests for the media data of the second period.

In another example, a method of signaling data related to streaming media data includes determining that a first portion of media content has been lost and that a second portion of the media content has been received, signaling data for a first period of the media content, including at least the first portion, indicating that at least some media data of the first period is not available for the first period, and signaling data for a second period of the media content, corresponding to the second portion, indicating that media data is available for the second period, after signaling the data, receiving one or more requests for the media data of the second period, and in response to the requests, sending the requested media data of the second period.

In another example, a device for signaling data related to streaming media data includes one or more network interfaces configured to send and receive data via a network, and one or more processors configured to determine that a first portion of media content has been lost and that a second portion of the media content has been received, signal, via the network interfaces, data for a first period of the media content, including at least the first portion, indicating that at least some media data of the first period is not available for the first period, and signaling data for a second period of the media content, corresponding to the second portion, indicating that media data is available for the second period, after signaling the data, receive, via the network interfaces, one or more requests for the media data of the second period, and in response to the requests, send, via the network interfaces, the requested media data of the second period.

The details of one or more examples of the disclosure are set forth in the accompanying drawings and the description below. Other features, objects, and advantages will be apparent from the description and drawings, and from the claims.

DETAILED DESCRIPTION

In general, this disclosure describes techniques related to Dynamic Adaptive Streaming over HTTP (DASH), or other HTTP streaming based technologies. In the case of live streaming, the robustness of DASH operation maybe harmed for the following reasons: 1. Imprecise time synchronized clients, e.g. when the client clock drifts against the system clock and the client is not synchronizing frequently enough against the time-source. 2. Media presentation description (MPD) and Segment generation may be synchronized against a different time source than DASH client. 3. Encoder or DASH Media Presentation may have lost synchronization or does not get content. Examples are a. a loss of sync (e.g., cyclical redundancy check (CRC) failure on the input stream) b. a power glitch on the source c. someone pulling a cable 4. Encoder clock drift may occur between the sender and the receivers (longer term issue), e.g., due to encoder clock tolerance.

The above issues may be addressed, in accordance with the techniques of this disclosure, by any one or more of the following three technologies: 1. By providing a RESTful application programming interface (API) as defined in U.S. patent application Ser. No. 14/146,536, Stockhammer et al., "LIVE TIMING FOR DYNAMIC ADAPTIVE STREAMING OVER HTTP (DASH," filed Jan. 2, 2014, which is hereby incorporated by reference in its entirety. 2. By responding with a specific HTTP response that includes a parameter indicating the time of the server with a specifically formatted time code in case of an HTTP 404 response. The parameter may be added to the message body. The client may use this information in order to adjust its time reference to synchronize to the offering media presentation. This may address issues 1, 2, and 4 from above. 3. Adding an empty Period that signals the minimum duration of the outage. The duration may be extended in an MPD update until new media is provided. A client may use the information to show some blackout, such that the client is informed that no media was generated (or is available) for this sequence of time. 4. Adding a duration for the Period and starting the new Period with a start time that is larger than the sum of the start of the previous Period and the duration of the previous Period whereby the portion between the end of the previous Period and the start of the new Period may be referred to as empty Period with no media and the Period that contains a duration attribute such that the sum of the start of the this Period and the duration of this Period is smaller than the start of the next Period is known as early terminated Period.

In accordance with the techniques of this disclosure, as discussed above, a streaming server, such as a DASH streaming server, may signal a period of media content for which no media data is available. For example, the streaming server may signal a start time and a duration for the period, without signaling any other elements for the period. A client device, in turn, may determine that media data of the period is unavailable because only the start and duration elements are signaled for the period. In another version, the server may signal the end of the media in the Period adding the duration of the Period and may only start a new Period after with a start time that is larger than the sum of the previous Period and the duration of the previous Period. The time between the end of the media in the previous period and the start of the new Period is also referred to as empty Period and the Period that contains a duration attribute such that the sum of the start of the this Period and the duration of this Period is smaller than the start of the next Period is known as early terminated Period. Therefore, the client device may avoid sending requests for media data of that period, and instead, send requests for media data of a subsequent period, e.g., in response to an updated MPD for the media content that describes available media data for the subsequent period.

Any or all of the techniques of this disclosure may be incorporated into the DASH standard, or other such standards for live streaming.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period is specified by this period start time and the signaled duration of the first media segment. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. However, in the case of early terminated Periods, the media in this Period may terminate earlier then the start of the new Period, indicating a gap in the content offering. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

Figure 1:
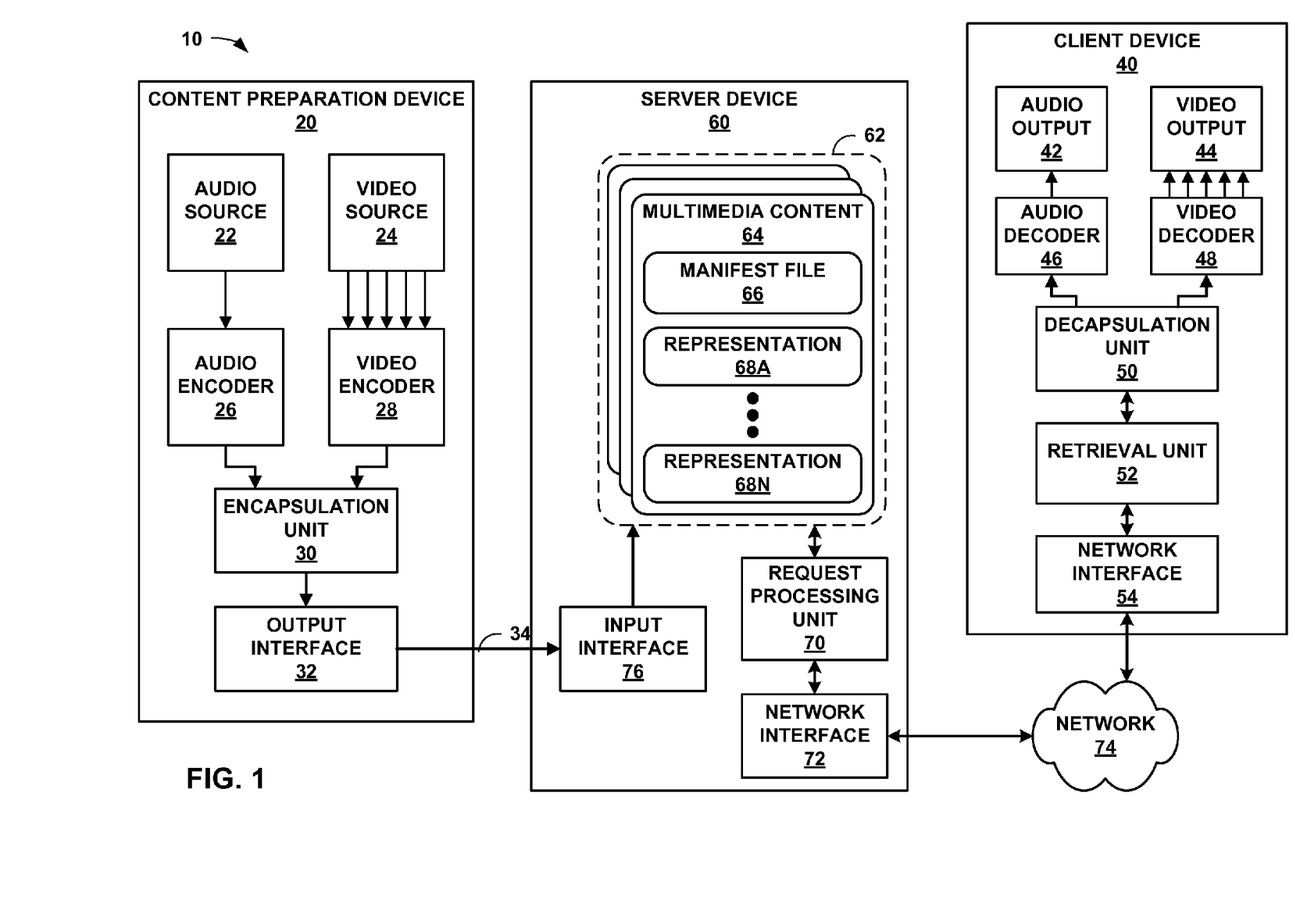
FIG. 1 is a block diagram illustrating an example system that implements techniques for streaming media data over a network.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 and the H.265 standards, for example, a "profile" is a subset of the entire bitstream syntax that is specified by the H.264 or H.265 standards. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. Likewise, server device 60 may receive the data from content preparation device 20 via input interface 76. In the example of FIG. 1, server device 60 includes storage medium 62 that stores various multimedia contents 64, each including a respective manifest file 66 and one or more representations 68A-68N (representations 68).

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes input interface 76, request processing unit 70, and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server, such as server device 60, via output interface 32. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

As discussed above, content preparation device 20 provides media data, e.g., live media data, to server device 60. For example, content preparation device 20 may transmit the media data via output interface 32 to input interface 76 as the media data is captured and encoded. In some instances, losses of the media data may occur. Thus, in accordance with the techniques of this disclosure, server device 60 may signal data for one or more periods of media content, such as multimedia content 64, for which no media data is available.

For example, server device 60 may create or modify manifest file 66 (e.g., an MPD) to include a period element representing playback time for which no media data is available. The period element may include data representing a start time for the period and a duration. The duration may correspond to a minimum amount of time from the start time for the period for which no media data is available. Server device 60 may provide manifest file 66 to client device 40 via network 74. Such a period element of an MPD is an example of data indicating that no media data is available for the period.

Retrieval unit 52 of client device 40 may use manifest file 66 to determine a period for which no media data is available. When such a period is discovered, retrieval unit 52 may avoid submitting requests for media data within the period. In some examples, retrieval unit 52 may submit one or more requests for media data following the start time plus the duration indicated in manifest file 66. If server device 60 has determined that media data is available following the period for which no media data is available, server device 60 may send the available media data to client device 40.

However, as noted above, the duration may represent a minimum amount of time from the start time for which no media data is available. Accordingly, server device 60 may instead respond to the request(s) for media data with an HTTP 404 "unavailable" error. The error may further include an indication of when media data will be available, e.g., in an extension of an HTTP header. The indication of when the media data will be available may correspond to a synchronization time expressed in network time protocol (NTP), an International Organization for Standardization (ISO) time format, or the like. Additionally or alternatively, server device 60 may send an updated manifest file to client device 40 including an indication of a subsequent period for which media data is available.

Furthermore, this disclosure recognizes that in some instances, an internal clock of client device 40 may become unsynchronized relative to the clock of server device 60, with respect to "wall clock" times at which media data is advertised as being available in the MPD. Therefore, the techniques of this disclosure may also be used when an internal clock of client device 40 has drifted relative to a clock of server device 60. As noted above, server device 60 may send an HTTP 404 error response to a request for unavailable media data from client device 40. In addition, the error response may indicate a time at which subsequent media data will be available and/or a synchronization method and/or server. Thus, client device 40 may use this data to resynchronize with the clock of server device 60 and/or to determine a wall clock time at which media data of a period will be available for retrieval. Such an error response is another example of data indicating that media data of a period is unavailable (i.e., that no media data of the period is available).

Figure 2:
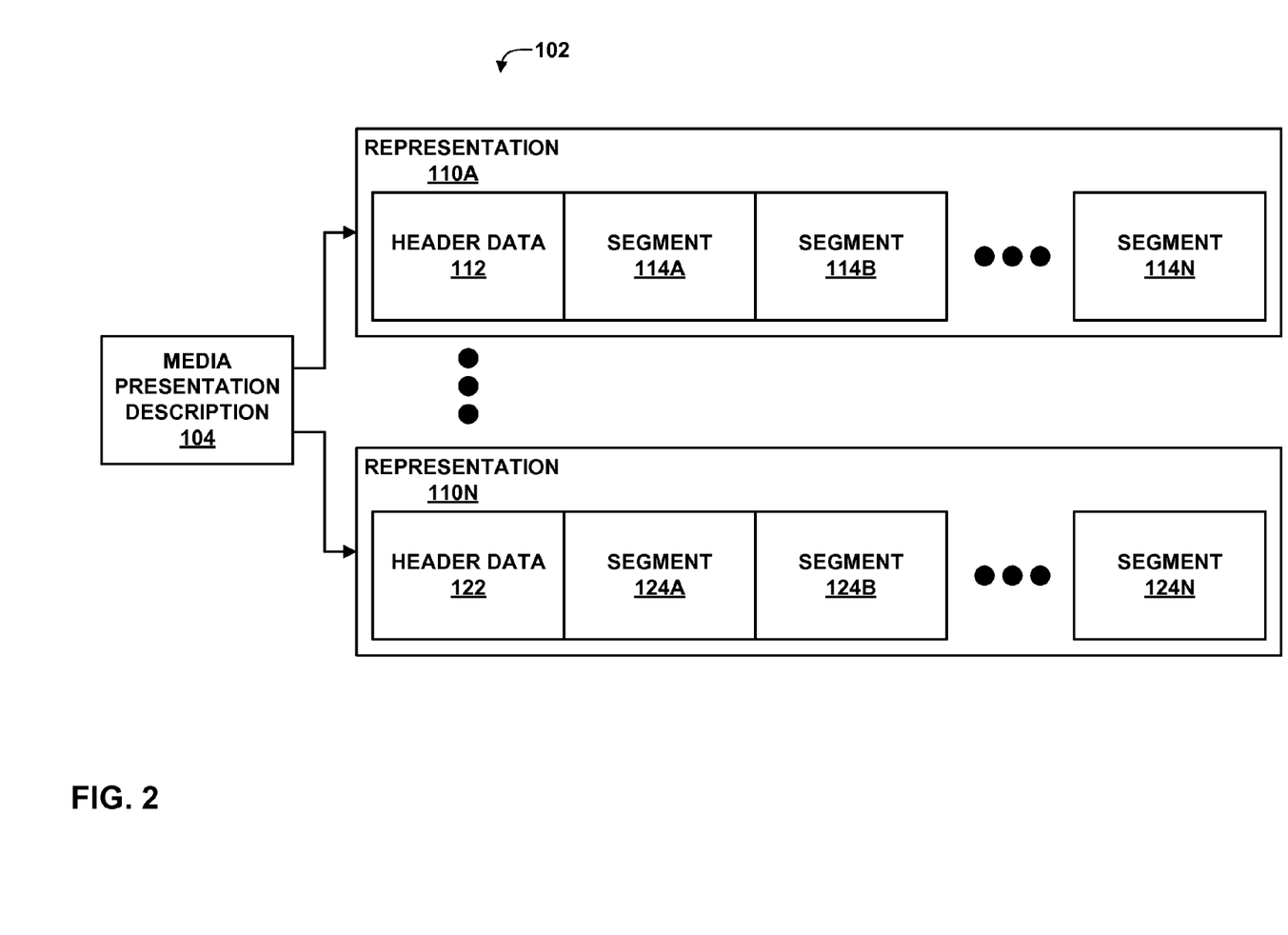
FIG. 2 is a conceptual diagram illustrating elements of example multimedia content.

FIG. 2 is a conceptual diagram illustrating elements of example multimedia content 102. Multimedia content 102 may correspond to multimedia content 64 (FIG. 1), or another multimedia content stored in memory 62. In the example of FIG. 2, multimedia content 102 includes media presentation description (MPD) 104 and a plurality of representations 110A-110N (representations 110). Representation 110A includes optional header data 112 and segments 114A-114N (segments 114), while representation 110N includes optional header data 122 and segments 124A-124N (segments 124). The letter N is used to designate the last movie fragment in each of representations 110 as a matter of convenience. In some examples, there may be different numbers of movie fragments between representations 110.

MPD 104 may comprise a data structure separate from representations 110. MPD 104 may correspond to manifest file 66 of FIG. 1. Likewise, representations 110 may correspond to representations 68 of FIG. 1. In general, MPD 104 may include data that generally describes characteristics of representations 110, such as coding and rendering characteristics, adaptation sets, a profile to which MPD 104 corresponds, text type information, camera angle information, rating information, trick mode information (e.g., information indicative of representations that include temporal sub-sequences), and/or information for retrieving remote periods (e.g., for targeted advertisement insertion into media content during playback).

In accordance with the techniques of this disclosure, MPD 104 may include a period element for which no media data is available. For example, MPD 104 may include a period element including a Period@start element and a Period@duration element, with no other elements. A client device, such as client device 40, may determine that no media data is available for such a period from this data of MPD 104, thereby avoiding submission of requests for media data that is not available, which may preserve network bandwidth and reduce processing power performed both by the server and the client.

In another example with the techniques of this disclosure, MPD 104 may include a period element for which media data is only available for the first portion, but not at the end. For example, MPD 104 may include a period element including a Period@start element and a Period@duration element and a new Period element with Period@start greater than the sum of Period@start and Period@duration of the first Period. A client device, such as client device 40, may determine that no media data is available for the time between the sum of the two elements of the first period and the start of the next period, thereby avoiding submission of requests for media data that is not available, which may preserve network bandwidth and reduce processing power performed both by the server and the client.

Although a single MPD 104 is shown in FIG. 2, it should be understood that MPD 104 may in fact be realized by a plurality of data sets: an initial MPD and one or more updates to the initial MPD. For instance, updates to the initial (or a previous) MPD may include new period elements for multimedia content 102. In some examples, a period may correspond to a single one of representations 110, whereas in other examples, a period may correspond to multiple (e.g., all or a subset of) representations 110.

Header data 112, when present, may describe characteristics of segments 114, e.g., temporal locations of random access points (RAPS, also referred to as stream access points (SAPs)), which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 104.

Segments 114, 124 include one or more coded video samples, each of which may include frames or slices of video data. Each of the coded video samples of segments 114 may have similar characteristics, e.g., height, width, and bandwidth requirements. Such characteristics may be described by data of MPD 104, though such data is not illustrated in the example of FIG. 2. MPD 104 may include characteristics as described by the 3GPP Specification, with the addition of any or all of the signaled information described in this disclosure.

Each of segments 114, 124 may be associated with a unique uniform resource locator (URL). Thus, each of segments 114, 124 may be independently retrievable using a streaming network protocol, such as DASH. In this manner, a destination device, such as client device 40, may use an HTTP GET request to retrieve segments 114 or 124. In some examples, client device 40 may use HTTP partial GET requests to retrieve specific byte ranges of segments 114 or 124.

Figure 3:
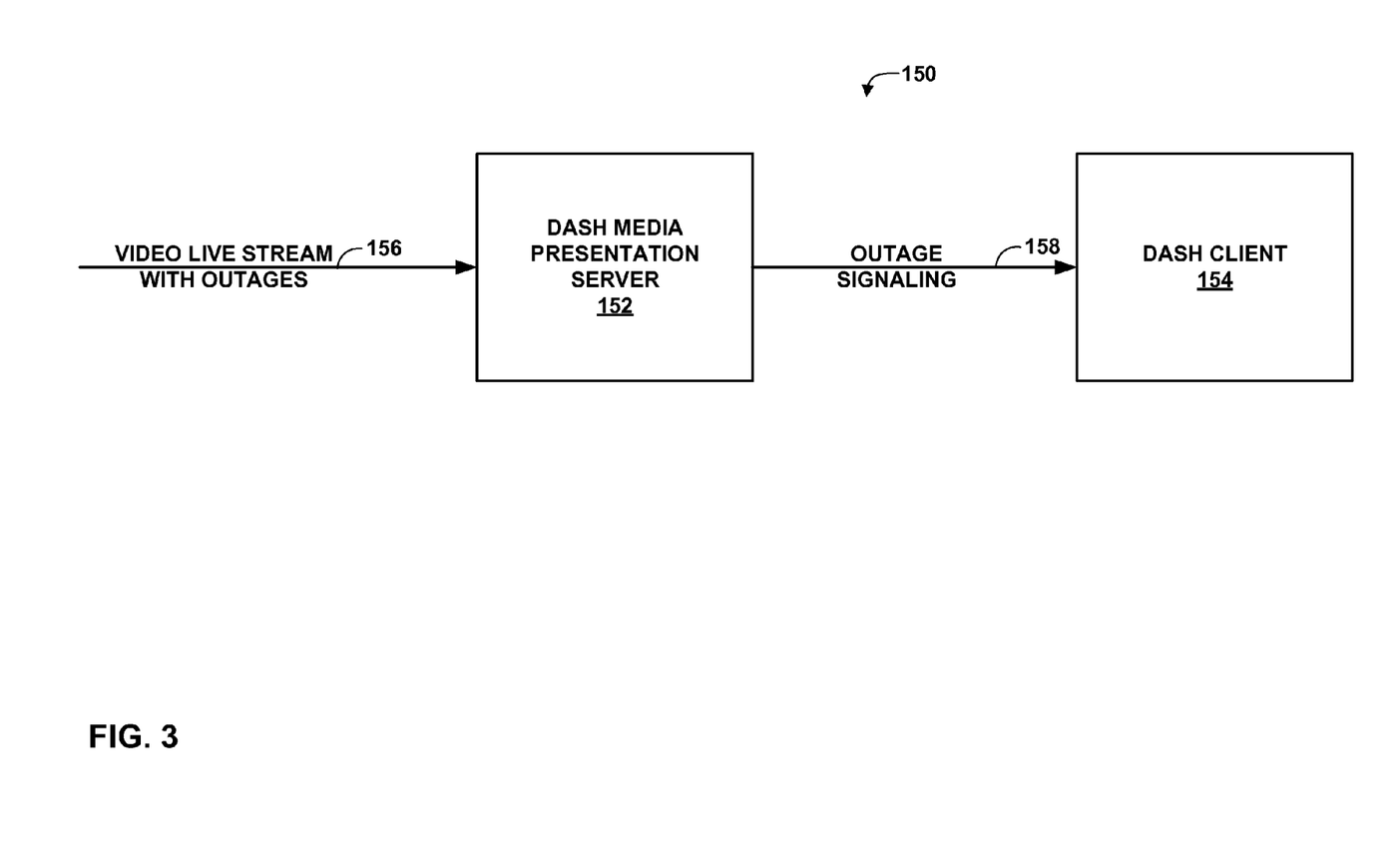
FIG. 3 is a block diagram illustrating a system for performing the techniques of this disclosure.

FIG. 3 is a block diagram illustrating a system 150 that may perform the techniques of this disclosure. The system of FIG. 3 includes DASH media presentation server 152 and DASH client 154. DASH media presentation server 152 may correspond to server device 60 of FIG. 1, while DASH client 154 may correspond to client device 40 of FIG. 1. DASH media presentation server 152 may receive a live video stream with outages 156. DASH media presentation server 152 may signal outages to DASH client 154 (158), in accordance with the techniques of this disclosure.

For instance, DASH media presentation server 152 may respond to a request (e.g., an HTTP GET or partial GET request from DASH client 154) with a specific HTTP response that includes the time of the server with a specifically formatted time code in case of an HTTP 404 response. The parameter may be added to the message body. DASH client 154 may use this information in order to adjust its time reference (e.g., a local clock of DASH client 154) to synchronize the clock to the offering of the media presentation.

Additionally or alternatively, DASH media presentation server 152 may add an empty Period that signals the minimum duration of an outage to data of a representation. The duration may be extended in a media presentation description (MPD) update until new media is provided. DASH client 154 may use the information to show some blackout, but DASH client 154 is informed that no media was generated for this sequence of time. In this manner, when outages are present in video data received by DASH media presentation server 152, DASH client 154 can determine that no media data exists for time during which the outage occurred, and therefore, for example, remain temporally synchronized with DASH media presentation server 152.

Figure 4:
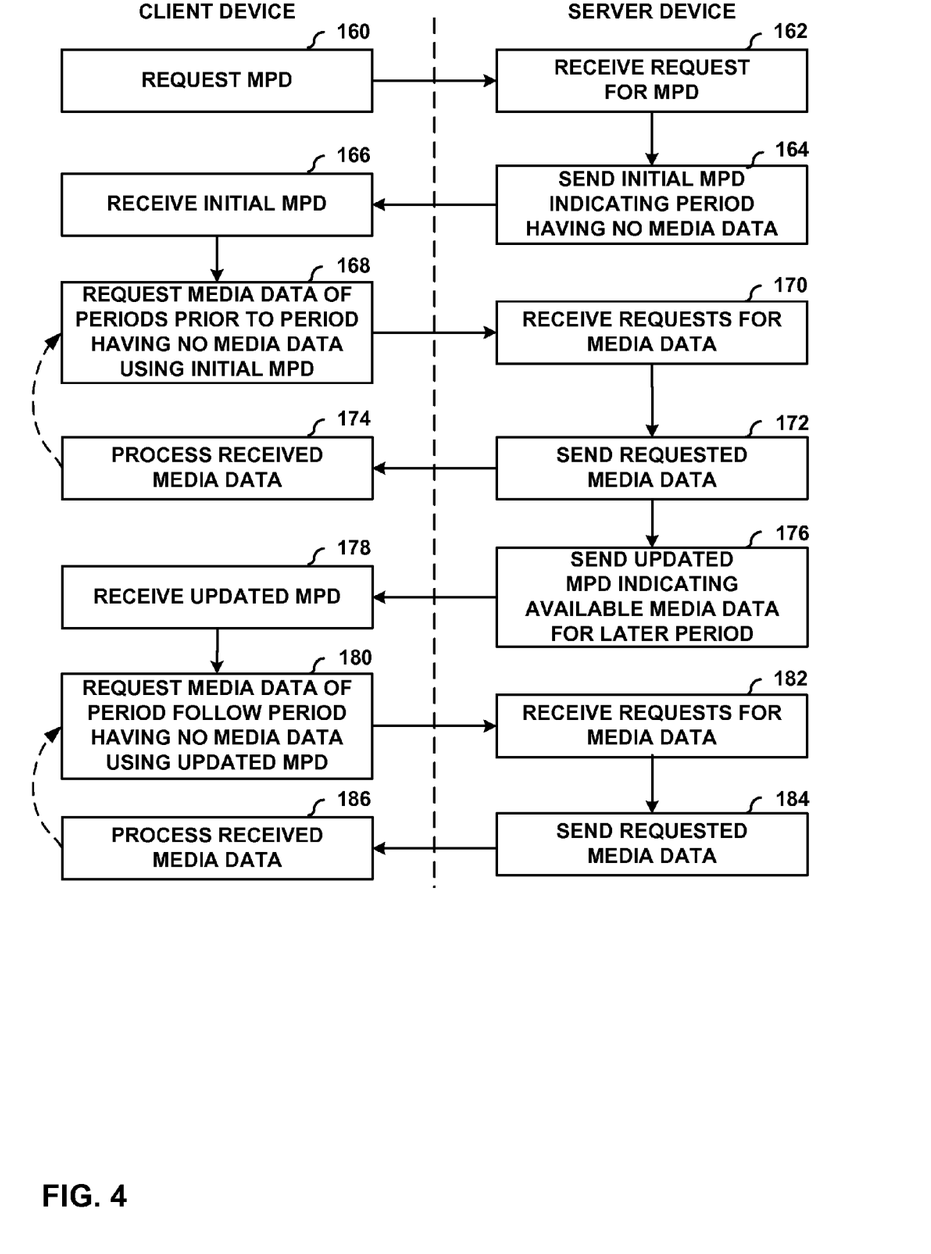
FIG. 4 is a flowchart illustrating an example method for exchanging information indicating that media data for a period of media content is not available.

FIG. 4 is a flowchart illustrating an example method for exchanging information indicating that media data for a period of media content is not available. The method of FIG. 4 is explained with respect to client device 40 and server device 60 of FIG. 1. However, it should be understood that other devices may be configured to perform this or a similar method.

Initially, in the example of FIG. 4, client device 40 requests an MPD for media content from server device 60 (160). Server device 60 receives the request for the MPD (162) and sends an initial MPD indicating a period having no media data (164). Although not shown in FIG. 4, server device 60 may determine that a portion of media data was not received, e.g., from content preparation device 20. In order to avoid delays of subsequent media data, rather than waiting for a retransmission of the media data that was not received, server device 60 may prepare the initial MPD to indicate that a period corresponding to the media data that was not received does not have available media data. For example, the initial MPD may signal a period start time (Period@start) and a duration (Period@duration) for the period, with no other elements signaled for the period, to indicate that media data is not available for that period. As another example the MPD may signal a Period@start and a Period@duration for the first Period for which the sum is smaller than the Period@start of the next Period. For the time gap in between, no media is available. The term "initial MPD" may refer to an ordinal first instance of the MPD or to an updated version of the MPD.

Client device 40 may receive the initial MPD (166). Assuming there are one or more periods prior to the period for which no media data is available, client device 40 may request media data of the periods prior to the period having no media data using the initial MPD (168). For example, such requests may comprise HTTP GET or partial GET requests. Server device 60 may receive the requests for the media data (170) and send the requested media data (172) in response to the requests. Client device 40 may process the received media data (174), e.g., by decoding the media data and presenting the media data to a user.

In the example of FIG. 4, server device 60 sends an updated MPD indicating available media data for a later period (176), that is, a period following the period for which no media data is available. In some examples, server device 60 may send the updated MPD automatically, while in other examples, server device 60 may send the updated MPD in response to a request from client device 40 (not shown). In any case, client device 40 receives the updated MPD (178) and requests media data of the period following the period having no media data using the updated MPD (180). In this manner, client device 40 omits sending requests for media data of the period for which no media data is available. Server device 60 receives the requests for media data from client device 40 (182) and sends the requested media data to client device 40 in response to the requests (184). Client device 40 processes the received media data (186), e.g., by decoding and presenting the received media data.

In this manner, the method of FIG. 4 represents an example of a method including receiving data for a first period of media content and a second period of the media content, wherein the data for the first period indicates that no media data is available for the first period, and wherein the data for the second period indicates available media data for the second period, and based on the data for the first period and the second period, omitting requests for media data of the first period and sending one or more requests for the media data of the second period.

The method of FIG. 4 also represents an example of a method including determining that a first portion of media content has been lost and that a second portion of the media content has been received, signaling data for a first period of the media content, corresponding to the first portion, indicating that media data is not available for the first period, and signaling data for a second period of the media content, corresponding to the second portion, indicating that media data is available for the second period, after signaling the data, receiving one or more requests for the media data of the second period, and in response to the requests, sending the requested media data of the second period.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of receiving data related to streaming media data, the method comprising:
    receiving data for a first period of media content and a second period of the media content, wherein the data for the first period comprises a first Period@start element for the first period and a first Period@duration element for the first period, wherein the first Period@duration element indicates that at least some media data of the first period is not available, wherein the data for the second period comprises a second Period@start element having a value that is larger than a sum of the first Period@start element and the first Period@duration element, and wherein the data for the second period indicates available media data for the second period; and based on the data for the first period and the second period, omitting requests for media data of the first period that the data for the first period indicates is not available and sending one or more requests for the media data of the second period.

2. The method of claim 1, wherein the data for the first period indicates a duration from the first period within which no media data is available, and wherein omitting comprises omitting requests for media data within the duration of the first period.

3. The method of claim 1, wherein receiving the data for the first period comprises receiving an HTTP 404 error in response to a request for media data of the first period, wherein the data further indicates synchronization data for synchronizing wall clock time, the method further comprising synchronizing an internal clock according to the data for synchronizing wall clock time.

4. The method of claim 1, wherein receiving the data comprises:
receiving the data for the first period in an initial media presentation description (MPD); and
receiving the data for the second period in an updated MPD corresponding to the initial MPD.

5. The method of claim 1, wherein the first Period@start element represents a playback time for a start of the first period, and wherein the first Period@duration element represents duration of playback time from the start of the first period to an end of available media data in the first period.

6. The method of claim 5, further comprising:
omitting playback of media data for the first period starting from a time indicated by the sum of the first Period@start and the first Period@duration until a time indicated by the second Period@start element; and
starting playback of the media data of the second period at the time indicated by the second Period@start element.

7. A device for receiving data related to streaming media data, the device comprising:
one or more network interfaces configured to send and receive data via a network; and
one or more processors implemented in circuitry and configured to:
receive, via the network interfaces, data for a first period of media content and a second period of the media content, wherein the data for the first period comprises a first Period@start element for the first period and a first Period@duration element for the first period, wherein the first Period@duration element indicates that at least some media data of the first period is not available, wherein the data for the second period comprises a second Period@start element having a value that is larger than a sum of the first Period@start element and the first Period@duration element, and wherein the data for the second period indicates available media data for the second period, and
based on the data for the first period and the second period, omit requests for media data of the first period that the data for the first period indicates is not available and sending one or more requests for the media data of the second period.

8. The device of claim 7, wherein the data for the first period indicates a duration from the first period within which no media data is available, and wherein omitting comprises omitting requests for media data within the duration of the first period.

9. The device of claim 7, further comprising an internal clock, wherein the data for the first period comprises an HTTP 404 error in response to a request for media data of the first period, wherein the data further indicates synchronization data for synchronizing wall clock time, and wherein the one or more processors are further configured to synchronize the internal clock according to the data for synchronizing wall clock time.

10. The device of claim 7, wherein the one or more processors are configured to receive the data for the first period in an initial media presentation description (MPD), and to receive the data for the second period in an updated MPD corresponding to the initial MPD.

11. The device of claim 7, wherein the first Period@start element represents a playback time for a start of the first period, and wherein the first Period@duration element represents duration of playback time from the start of the first period to an end of available media data in the first period.

12. The device of claim 11, wherein the one or more processors are further configured to omit playback of media data for the first period starting from a time indicated by the sum of the first Period@start and the first Period@duration until a time indicated by the second Period@start element, and start playback of the media data of the second period at the time indicated by the second Period@start element.

13. A method of signaling data related to streaming media data, the method comprising:
determining that a first portion of media content has been lost and that a second portion of the media content has been received;
signaling data for a first period of the media content, the first period including at least the first portion, wherein signaling the data for the first period comprises signaling a first Period@start element for the first period and a first Period@duration element for the first period, and wherein the first Period@duration element indicates that at least some media data of the first period is not available for the first period;
signaling data for a second period of the media content, the second period corresponding to the second portion, wherein signaling the data for the second period comprises signaling a second Period@start element having a value that is larger than a sum of the first Period@start element and the first Period@duration element, and wherein the data for second period indicates that media data is available for the second period;
after signaling the data for the first period and the data for the second period, receiving one or more requests for the media data of the second period; and
in response to the requests, sending the requested media data of the second period.

14. The method of claim 13, wherein the data for the first period indicates a duration from the first period within which no media data is available.

15. The method of claim 13, wherein signaling comprises:
signaling the data for the first period in an initial media presentation description (MPD); and
signaling the data for the second period in an updated MPD corresponding to the initial MPD.

16. The method of claim 13, further comprising sending data indicating a synchronized time at which the media data of the second period is available.

17. The method of claim 16, wherein sending the data comprises including the data in an HTTP header using an extension header.

18. The method of claim 16, wherein sending the data comprises sending the data together with an HTTP 404 error code.

19. The method of claim 16, wherein sending the data comprises sending the data indicating the synchronized time according to network time protocol (NTP) format.

20. The method of claim 16, wherein sending the data comprises sending the data indicating the synchronized time according to an International Organization for Standardization (ISO) time format.

21. A device for signaling data related to streaming media data, the device comprising:
one or more network interfaces configured to send and receive data via a network; and
one or more processors implemented in circuitry and configured to:
determine that a first portion of media content has been lost and that a second portion of the media content has been received,
signal, via the network interfaces, data for a first period of the media content, the first period including at least the first portion, wherein the one or more processors are configured to signal a first Period@start element for the first period and a first Period@duration element for the first period, and wherein the first Period@duration element indicates that at least some media data of the first period is not available for the first period,
signal data for a second period of the media content, the second period corresponding to the second portion, wherein the one or more processors are configured to signal a second Period@start element having a value that is larger than a sum of the first Period@start element and the first Period@duration element, wherein the data for second period indicates that media data is available for the second period,
after signaling the data for the first period and the data for the second period, receive, via the network interfaces, one or more requests for the media data of the second period, and
in response to the requests, send, via the network interfaces, the requested media data of the second period.

22. The device of claim 21, wherein the data for the first period indicates a duration from the first period within which no media data is available.

23. The device of claim 21, wherein the one or more processors are configured to signal the data for the first period in an initial media presentation description (MPD), and signal the data for the second period in an updated MPD corresponding to the initial MPD.

24. The device of claim 21, wherein the one or more processors are further configured to send, via the network interfaces, data indicating a synchronized time at which the media data of the second period is available.

25. The device of claim 24, wherein the one or more processors are configured to include the data indicating the synchronized time in an HTTP header using an extension header.

26. The device of claim 24, wherein the one or more processors are configured to include the data indicating the synchronized time together with an HTTP 404 error code.

27. The device of claim 24, wherein the one or more processors are configured to format the data indicating the synchronized time according to network time protocol (NTP) format.

28. The device of claim 24, wherein the one or more processors are configured to format the data indicating the synchronized time according to an International Organization for Standardization (ISO) time format.

* * * * *